United States Patent [19]

Skakunov et al.

[11] 4,174,989
[45] Nov. 20, 1979

[54] METHOD OF FABRICATING DOUBLE-CURVATURE SHELLS

[76] Inventors: Mikhail G. Skakunov, ulitsa Zelenaya, 6, kv. 60, Levoberezhnaya Moskovskoi oblasti; Konstantin K. Lipodat, 2nd Samotechny pereulok, 4, korpus 1, kv. 37; Leonid V. Karasev, 1st Radiatorskaya 3, kv. 62, both of Moscow; Vilgelm V. Modzelevsky, ulitsa Molodogvardeiskaya, 225, kv. 106, Kuibyshev, all of U.S.S.R.

[21] Appl. No.: 917,517

[22] Filed: Jun. 21, 1978

[30] Foreign Application Priority Data

Sep. 27, 1977 [SU] U.S.S.R. .............................. 2522319[I]

[51] Int. Cl.² .............................................. B65C 3/26
[52] U.S. Cl. ...................................... 156/156; 156/184; 156/189; 156/191; 156/194; 156/196; 156/287; 156/306
[58] Field of Search ............... 156/156, 184, 189, 191, 156/194, 196, 287, 306; 428/35; 220/4 R

[56] References Cited

U.S. PATENT DOCUMENTS 4,050,607  9/1977  Smith ...................................... 428/35

*Primary Examiner*—Marion E. McCamish
*Attorney, Agent, or Firm*—Burgess, Ryan and Wayne

[57] ABSTRACT

A method of fabricating double-curvature shells from meridional petaloid sections consisting in that the prefabricated meridional petaloid sections are joined consecutively with one another in a number required for making a shell. The meridional petaloid sections are made from a flexible material and in the process of their joining they are successively coiled into a spindle-shaped roll for storage and transportation and the double-curvature shell is made by applying an axial force to at least one of the roll ends for uncoiling the roll and simultaneously imparting a longitudinal curvature to said sections after which the first and the last sections are joined with each other. The method according to the invention permits fabrication of high-quality double-curvature shells of any volume from any flexible material, it is highly efficient, calls for low expenditures of labor and funds, is simple and convenient in practice.

5 Claims, 5 Drawing Figures

METHOD OF FABRICATING DOUBLE-CURVATURE SHELLS

FIELD OF APPLICATION

The present invention relates to methods of fabricating double-curvature shells.

The disclosed method will prove most efficient for making double-curvature shells such as thin-walled spherical metal reservoirs consisting of prefabricated thin meridional petaloid sections which are capable of bending. Though the term "meridional" petaloid sections is well known to those skilled in the fabrication of spherical reservoirs, still, to avoid probable misunderstandings, this term as used herein should be understood as defining sections extending from the top to the base of the reservoir, each section being delimited by two meridians of the sphere.

The disclosed method is suitable for fabricating double-curvature shells from a variety of flexible materials such as cardboard, plastics, etc.

PRIOR ART METHOD AND ITS DISADVANTAGES

Known in the prior art is a method of fabricating spherical reservoirs from meridional petaloid sections which are shaped into a double curvature corresponding to the curvature of the future sphere and then jointed successively to one another in the number required for forming a spherical reservoir (see, for example, Inventor's Certificate No. 271693 Cl. B23K 37/04, USSR).

This method can be used for making spherical reservoirs both at their installation site and in a factory.

This method is rather labor-consuming and inefficient since it includes many complicated operations related to preliminary manufacture of meridional petaloid sections, imparting to them a final curvature, assembling and welding them, these operations following consecutively one after another.

Besides, this method involves considerable expenditures of funds since it calls for the use of sophisticated equipment and a large number of servicing personnel.

If the prior art method is realized at the installation site of the spherical reservoirs, for example in the open, under varying weather conditions, it becomes particularly labor-consuming and inefficient and the quality of welds made under these conditions cuts down considerably the life of the reservoir.

The above-described method is fully realized in a factory only when making spherical reservoirs of a comparatively small size. The dimensions of these reservoirs are limited by the capabilities of the transport facilities in carrying the fabricated product to the installation site.

Besides, known in the prior art are methods of fabricating double-curvature shells of comparatively large dimensions, used as storage tanks for liquid and gaseous materials, in which individual elements are assembled into several belts, said belts are coiled into rolls and the latter are then used for assembling a reservoir.

The bulk of the welds in these rolls is made in factory conditions. Such rolls can be relatively easily transported to the point of shell installation.

In the course of fabrication each belt is given a double curvature, then it is coiled into a roll on an axle which also has a double curvature corresponding to the double curvature of the belt. The axle serves for retaining the correct shape of the roll both in storage and during transportation to the point of shell installation.

As necessity arises, the factory-made rolls are uncoiled (in a factory or after transportation to the point of shell installation), assembled and welded to form a double-curvature shell.

However, this method just as the first-mentioned one is rather labour-consuming and inefficient since it includes many complex operations involved in preliminary fabrication of individual belts and imparting to them the final curvature, making the roll-supporting axles also shaped with a double curvature, uncoiling a multitude of rolls, assembling, fitting and welding individual belts into a finished article. Most operations in this method follow consecutively one after another.

In addition, like the first-mentioned method, this method calls for considerable material expenditures because it involves the use of sophisticated equipment and a large number of operators.

If the prefabricated rolls are transported to the shell installation site, e.g. into a field and the belts are then welded to one another in the open, so that the welds are comparatively long, this impairs the operational reliability of the shell.

OBJECTS AND BRIEF DESCRIPTION OF THE INVENTION

An object of the present invention resides in providing a method of fabricating double-curvature shells virtually of any size wherein the maximum number of joints for making a shell and shaping it conveniently for storage and transportation would be performed in factory conditions while the final shaping of the shell would be carried out at its installation site with the use of a comparatively small number of joints.

Another object of the present invention resides in reducing material expenditures in fabricating shells.

Still another object of the present invention resides in extending the service life of shells.

SUBSTANCE OF THE INVENTION

This object is accomplished by providing a method of fabricating double-curvature shells from meridional petaloid sections of a flexible material consisting in that the prefabricated sections are consecutively connected with one another in the number required for making a shell wherein, according to the invention, the meridional petaloid sections in the process of their joining are consecutively and simultaneously coiled into a spindle-shaped roll for storage and transportation and the double-curvature shell is made by applying an axial force to at least one of the roll ends for uncoiling said roll and simultaneously imparting to it a longitudinal curvature after which the first and last sections are joined to each other.

It is expedient that in the process of roll coiling at least one guide element for the roll turns should be placed into the roll in a lateral direction relative to its imaginary axis, securing the ends of said element to the first and last meridional petaloid sections and removing said guide element after uncoiling the roll.

It is expedient that the guide element for the roll turns should be made from a round bar.

The provision of the guide element ensures reliable uncoiling of the roll since the roll turns slide relative to one another during uncoiling.

The use of a round bar in the capacity of the guide element ensures a point-like contact of the turns with one another.

It is no less practicable that the roll at the beginning of its coiling should be provided with a hollow rod arranged longitudinally with respect to the imaginary axis of the roll and that the ends of said rod should be joined with the double-curvature shell after its shaping so that said rod would serve as a load-bearing strut of the shell.

The hollow rod increases the stiffness and stability of the shell.

It is also practicable that the inside space of the fabricated double-curvature shell should be filled with fluid under an overpressure for imparting to it a spherical shape and straightening out any defects that have occurred during transportation.

The method of fabricating double-curvature shells realized according to the present invention makes it possible to perform a maximum amount of joints, i.e. welded seams in factory conditions which extends the service life of the shells. The coiling of the joined meridional petaloid sections into a spindle-shaped roll makes it possible to fabricate shells of practically any size in the factory conditions because the rolls of this shape are easy to carry to the installation site after which the shell is finally shaped by comparatively simple devices.

The double-curvature shells realized by the claimed method feature a high quality of joints and, as a result, are more durable.

BRIEF DESCRIPTION OF THE DRAWINGS

Now the invention will be described by way of example with reference to the appended drawings in which.

DETAILED DESCRIPTION OF AN EMBODIMENT OF THE INVENTION

The embodiment of the method described herein illustrates the fabrication of double-curvature shells, i.e. thin-walled spherical reservoirs of comparatively large volumes for storing liquid or gaseous products, such as, say, petroleum.

The meridional petaloid sections 1 (FIG. 1) referred to hereunder as "sections" are made in factory conditions from flexible thin steel sheets in the number required for assembling a single shell.

In the embodiment dealt with here the sections are flat and are delivered for assembly in the flat condition which simplifies considerably their fabrication.

The sections can be curved in a lateral direction corresponding to the lateral curvatures of the future shell.

In the embodiment described herein the flat thin steel sections 1 after being cut to the required pattern are welded consecutively to one another and are simultaneously coiled into a roll A.

In the process of welding the sections 1 and coiling them into a roll A, said sections are slightly deformed in the longitudinal and lateral directions, i.e. they acquire a preliminary double curvature.

Figure 1:
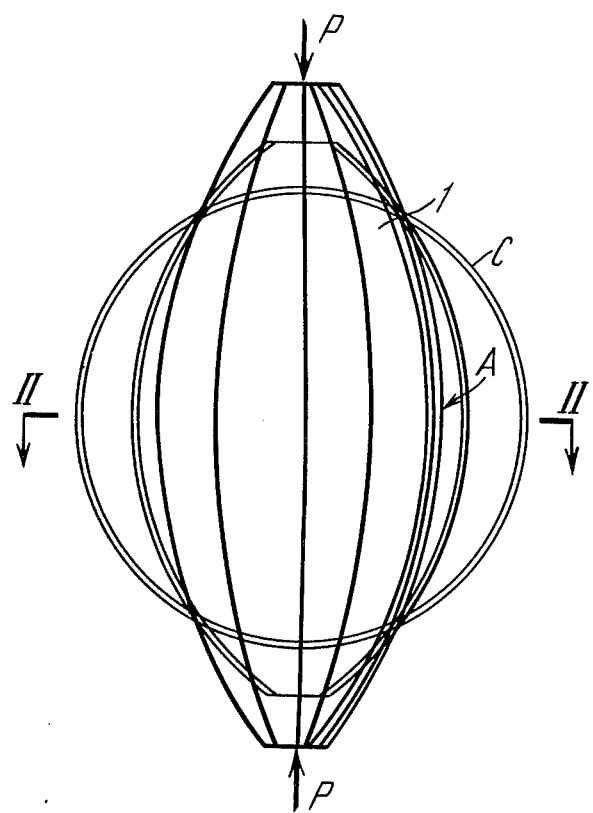
FIG. 1 is a schematic view of the roll intended to form a double-curvature shell, and a shell produced from said roll.

When the sections 1 are welded and coiled into the roll A the latter takes a spindle-like shape as shown in FIG. 1.

The finished roll A should have a diameter meeting the requirements of transportation, i.e. the number of its turns is directly dependent on the size of the shell.

Figure 2:
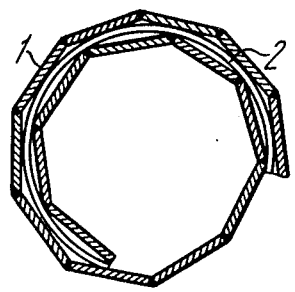
FIG. 2 is a section taken along line II—II in FIG. 1.

Simultaneously with coiling the roll A, a round bar 2 (FIG. 2) is arranged in it in the lateral direction relative to its imaginary axis "a", fastening one end of the bar to the first section and leaving the other end free.

The round bar 2 may be replaced by other known elements suitable for the purpose, e.g. a strip.

At the end of coiling the roll the free end of the bar 2 is secured to the last section by, say, welding, though other suitable methods of fastening may also be used.

The bar 2 serves as a guide for the roll turns during uncoiling of the roll and for increasing the stiffness of the roll "A" during transportation.

It is possible to put several round bars into a roll which improves its uncoiling and increases still more its stiffness.

The last section is fastened to the roll by welding though it can be done by other known means suitable for the purpose.

If the thin-walled double-curvature shell must have a load-bearing strut, the roll "B" (FIG. 3) at the beginning of its coiling is provided with a hollow rod 3 mounted longitudinally relative to the imaginary axis "a" of the roll and, after shaping the shell, the ends of said rod are connected to said shell.

The operations of welding and coiling the section into a roll "A" ("B"), imparting to it the preliminary curvature, inserting a round bar 2 and installing a hollow rod 3 are performed simultaneously on a single stand (not shown) in factory conditions. This raises output, saves the funds for fabricating the shell and, as shown above, prepares the shell for storage, transportation and shaping.

The predominant number of shell welds are made in factory conditions thus ensuring a high quality of welds and, consequently, of the shell in the course of its service.

After delivering the roll "A" (FIG. 1) to the point of its installation, the double-curvature shell "C" is shaped by applying an axial force P to at least one of its ends for uncoiling the roll A and imparting to it simultaneously longitudinal and lateral curvatures.

Figure 3:
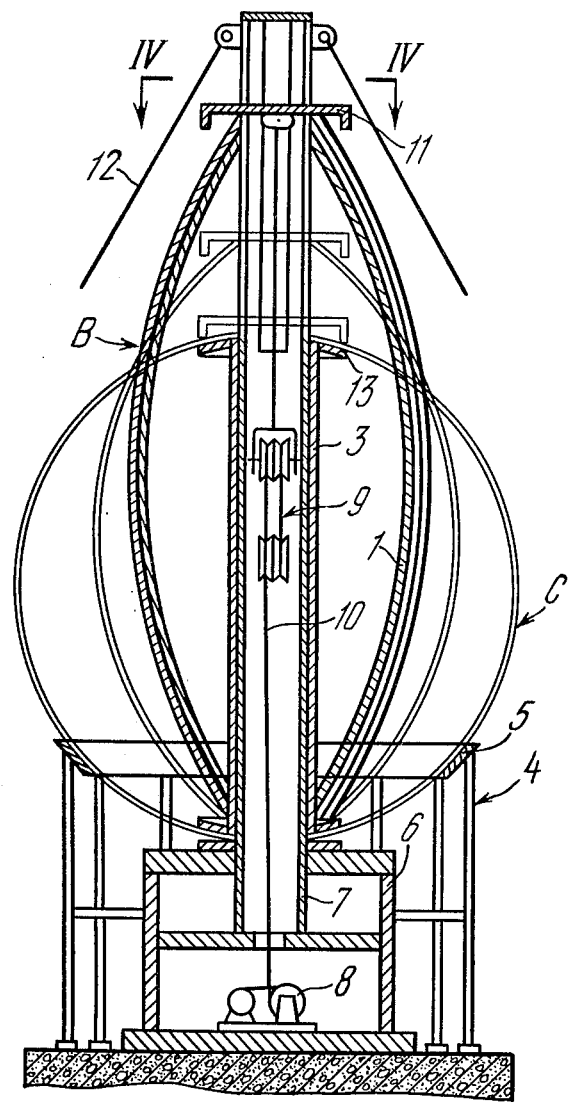
FIG. 3 shows a roll and a device for uncoiling it in a vertical position.

As can be seen in FIG. 3, the roll "A" is placed into a device 4 for final forming of the double-curvature shell "C".

The device 4 comprises a frame serving as a bed for the shell C and a support 6. The support 6 carries a vertical guide 7 which is passed through the roll "B".

If the roll incorporates a hollow rod 3, the guide 7 is passed through said hollow rod 3 as illustrated in FIG. 3.

Figure 4:
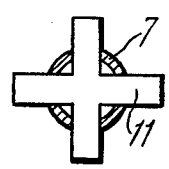
FIG. 4 is a section taken along line IV—IV in FIG. 3.

The device 4 has a mechanism for applying an axial force to one of the ends of the roll "B", said mechanism comprising a winch 8 and a tackle 9 whose cable 10 is secured by one end to the winch 8 and by the other end, to the thrust collar 11 (FIGS. 3,4) against which the end of the roll "B" bears. The thrust collar 11 is mounted on the guide 7 with a provision for moving over it for which purpose said guide is provided with slots.

To improve stability of the roll "B" in the course of its uncoiling, there are bracing cables 12 secured to the guide 7.

When the roll "B" is being uncoiled, the point of fastening the last section 1 is cut through.

Then an axial force is applied to the upper end of the roll "B" through the thrust collar 11, winding the cable on the drum of the winch 8, thereby uncoiling the roll "B" and simultaneously imparting longitudinal curvature to it.

The roll "B" is uncoiled without jamming due to the prevision of the round bar 2 (FIG. 2) which ensures a point-like contact between the turns and serves as a sliding guide for said turns. As the longitudinal deformation reaches a limit ensuring the required height of the shell, the winch is stopped.

After the winch 8 has been stopped but the roll "B" has not been completely uncoiled, a pulling force is applied to the end of the bar 2 which is welded to the last section. Then the bar 2 is withdrawn.

Now the first and the last sections 1 are connected to each other, the guide 7 is removed and the roll ends are closed with covers 13, which are fastened on the hollow rod, thereby closing the inner space of the shell "C".

Thus, the out-of-door assembly operations are brought to a minimum so that the work is confined to welding one joint between the first and the last sections which raises both the efficiency of the method and the quality of the fabricated shell.

After the first and the last sections have been welded together, this forms an essentially closed space whose longitudinal section corresponds to a finished shell while its cross section has the shape of a polygon.

To impart a spherical shape to the shell "C", its internal space is filled with fluid under overpressure so that its thin walls acquire the final spherical shape. Simultaneously, the welds of the shell are tested for tightness and all the surface defects that might have been caused by transportation are corrected.

Figure 5:
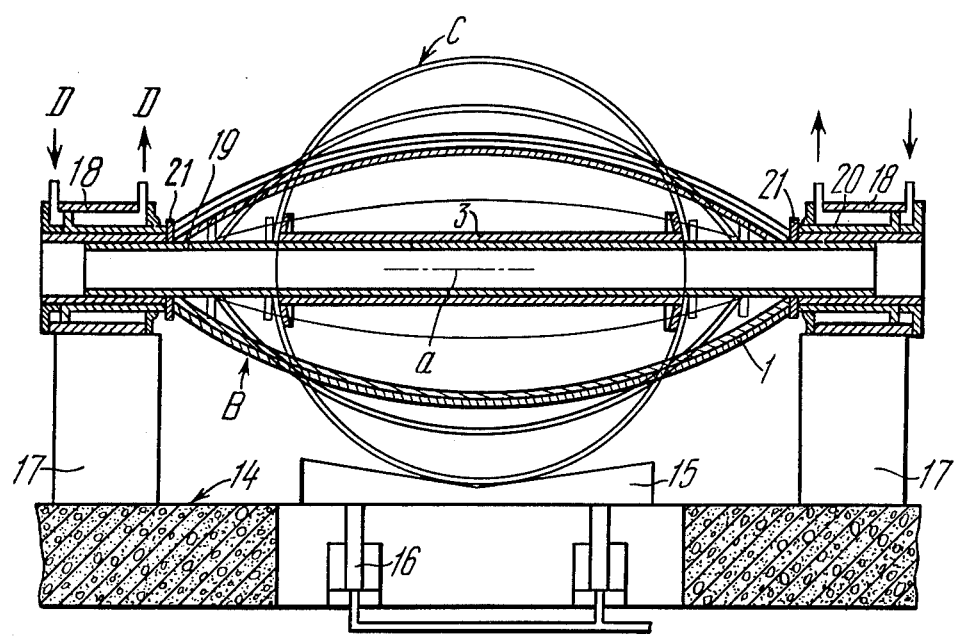
FIG. 5 shows a roll and a device for uncoiling it in a horizontal position.

As shown in FIG. 5, the roll "B" is placed in the device 14 in a horizontal position and forces are applied to both ends of the roll "B".

The device 14 comprises a bed 15 provided with a drive 16 for moving it vertically towards the roll "B" and supporting frames 17 with drives 18 constituted in the present embodiment by power cylinders also designated by FIG. 18.

The bed 15 is moved to the upper position so that the roll "B" carried by said bed gets aligned axially with the power cylinders 18.

Then a guide 19 is passed through the roll "B" and through the holes in the drives 18 so that the ends of said guide 19 are located in the drives 18.

The rod 20 of the power cylinder 18 carries thrust collars 21 for the ends of the roll "B".

When a fluid shown by arrows "D" is fed into the power cylinders, their rods 20 together with the thrust collars 21 move along the guide 19 towards each other thereby uncoiling the roll "B" and simultaneously imparting a longitudinal curvature to it.

Further operations related to the fabrication of a spherical double-curvature shell are similar to those described above.

Thus, it can be seen from the above that the claimed method is adapted for fabricating double-curvature shells of practically any size from any flexible material, ensuring a high quality of fabricated shells at a comparatively high efficiency and low expenditures of labour and funds.

Besides, the method according to the present invention ensures simplicity and convenience of work in the process of shell fabrication.

Experimental specimens of spherical shells have been made in accordance with the disclosed method.

The operations of coiling and uncoiling the roll called for comparatively small foces which have been created by elementary technical appliances. The operations related to coiling and uncoiling of the roll bore no influence upon the quality of its welds.

Inasmuch as the welds are made mostly in factory conditions and are not affected in any way during coiling and uncoiling of the roll, this extends considerably the service life of the double-curvature shell, i.e. spherical reservoir, as compared with the spherical reservoirs fabricated by the prior art method.

In describing the present embodiment of the invention the terms in their narrow sense are used for the sake of lucidity. However, the invention is not confined to the narrow sense of the terms used and it will be understood that each of said terms embraces all the equivalent elements functioning similarly and employed for the same purposes.

While a specific embodiment of the invention has been disclosed in the description, it will be understood that various modifications and changes within the spirit and the scope of the invention may occur to those skilled in the art.

These changes and modifications can be resorted to without departing from the function or the scope of the invention as hereinafter defined by the appended claims.

What is claimed is:

1. A method of fabricating double-curvature shells from meridional petaloid sections wherein said meridional petaloid sections prefabricated from a flexible material are consecutively joined with one another in a number required for making said shell; said meridional petaloid sections are consecutively coiled into a spindle-shaped roll in the process of joining said sections so that said sections are pre-curved in the lateral and longitudinal directions, said spindle-shaped roll being adapted for storage and transportation; said roll is subsequently uncoiled and curved in the longitudinal and lateral directions by applying an axial force to at least one of the ends of said spindle-shaped roll, thus forming a double-curvature shell; and the first and the last of said sections are thereafter joined with each other.

2. A method according to claim 1 wherein the roll being coiled is provided with at least one guide element for the coils of the roll, said element being set across the imaginary axis of said roll with one end of said element secured to the first meridional petaloid section and the other end, to the last meridional petaloid section, said guide element being removed after uncoiling the roll.

3. A method according to claim 2 wherein the guide element for the roll coils is made of a round bar.

4. A method according to claim 1 wherein at the start of coiling the roll, a hollow rod is inserted into said roll longitudinally relative to its imaginary axis so that, after making the double-curvature shell, the ends of said hollow rod are joined with said shell and said hollow rod serves as a load-bearing strut of the shell.

5. A method according to claim 1 wherein the space of the fabricated double-curvature shell is filled with a fluid under pressure for imparting to it a spherical shape and eliminating any defects that might have occurred during transportation.

* * * * *

UNITED STATES PATENT AND TRADEMARK OFFICE
CERTIFICATE OF CORRECTION

PATENT NO. : 4,174,989

DATED : November 20, 1979

INVENTOR(S) : Mikhail Grigorievich Skakunov, et al

It is certified that error appears in the above—identified patent and that said Letters Patent is hereby corrected as shown below:

Column 3, line 60: "curvatures" should be --curvature--.

Column 5, line 9: "prevision" should be --provision--.

Column 6, line 7: "foces" should be --forces--.

Signed and Sealed this

Seventeenth Day of June 1980

[SEAL]

Attest:

SIDNEY A. DIAMOND

Attesting Officer     Commissioner of Patents and Trademarks